UNITED STATES PATENT OFFICE.

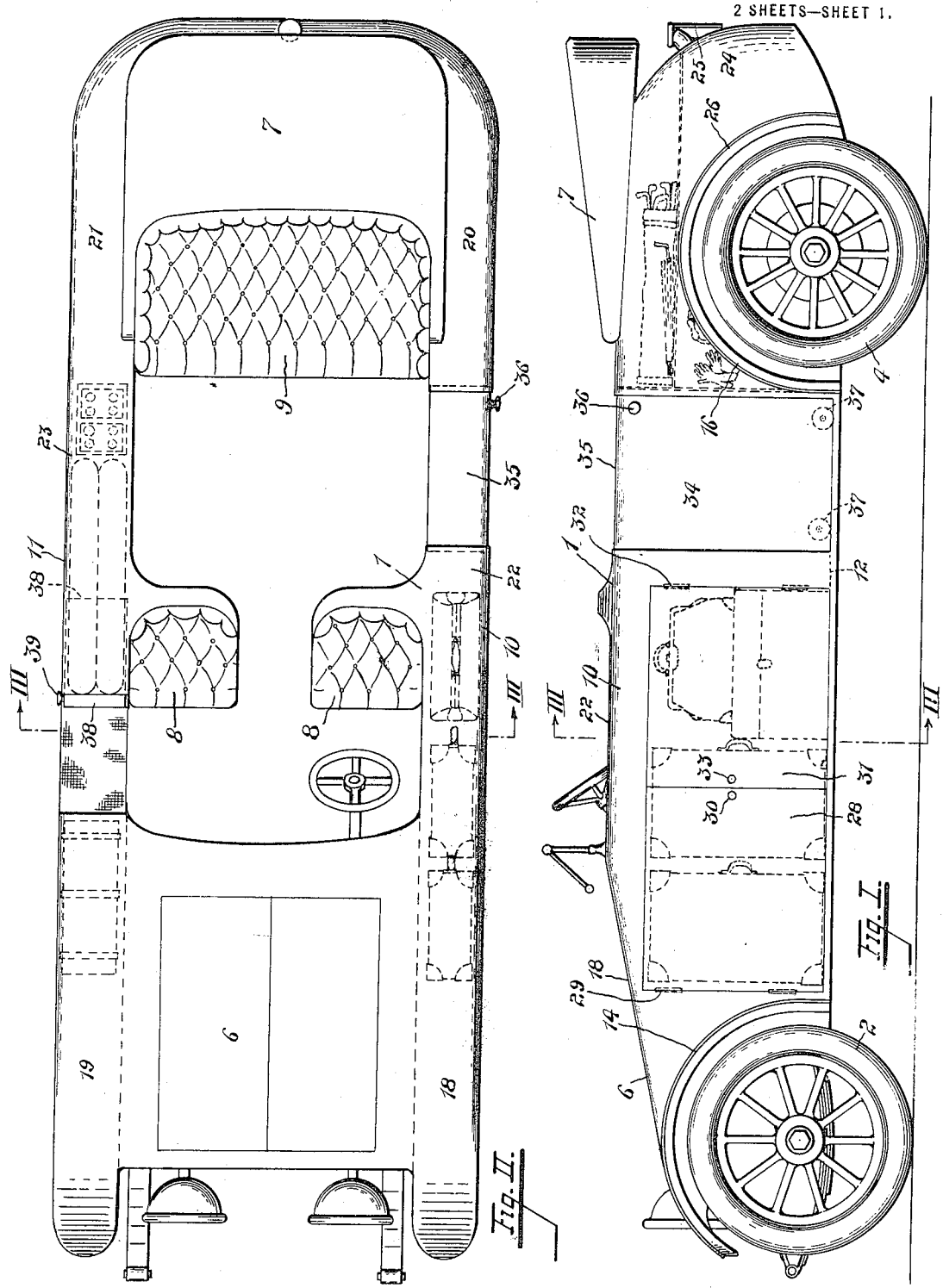

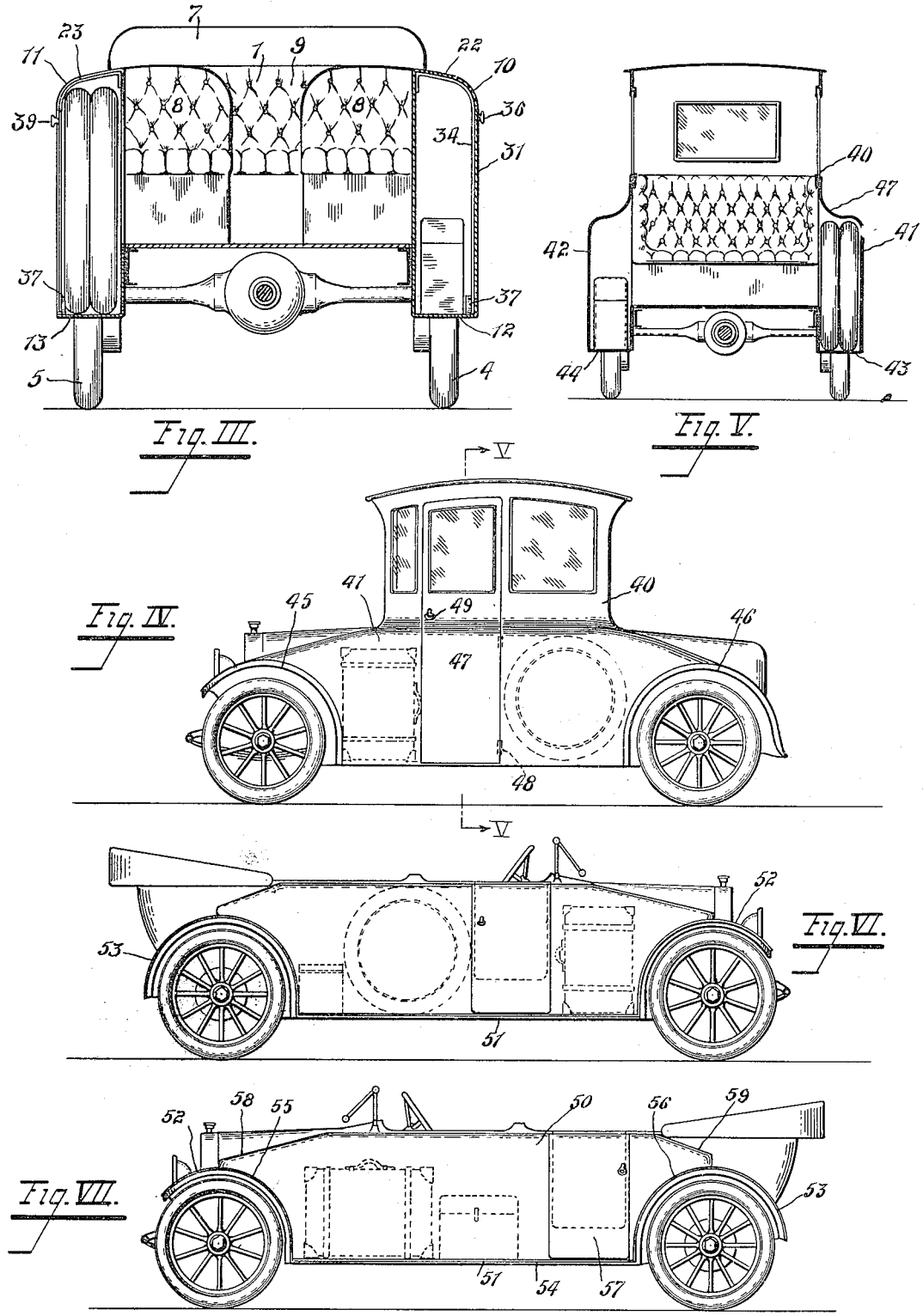

CURT B. MUELLER, OF LAKEWOOD, OHIO.

VEHICLE-BODY.

1,289,871.     Specification of Letters Patent.     Patented Dec. 31, 1918.

Application filed August 2, 1915. Serial No. 43,111.

*To all whom it may concern:*

Be it known that I, CURT B. MUELLER, a citizen of the United States, residing at 1428 Elbur avenue, in the city of Lakewood, Cuyahoga county, and State of Ohio, have invented a new and useful Improvement in Vehicle-Bodies, of which the following is a specification, the principle of the invention being herein explained and the best mode in which I have contemplated applying that principle, so as to distinguish it from other inventions.

The invention appertains to a vehicle body and more particularly to the design configuration and relative arrangement of various adjuncts thereof whereby certain space heretofore utilized only in small part is built into compartment form suited to an accommodation of miscellaneous equipment such as spare tires, baggage cases or some specific accessories and incidentally caused to present a neat and double " stream line " appearance. More particularly my idea involves a feasible utilization of substantially all of that space which has heretofore been left open between the running board, front and rear fenders and the longitudinal upper edge of the seating compartment. An arrangement after the manner exemplified by some of the views of the drawings makes it possible to dispense entirely with separate fenders and a running board as such, and at the same time afford a smooth gracefully defined side plane.

With the foregoing and other objects in view the invention consists of the novel construction, combination and arrangement of parts as hereinafter more specifically described and illustrated in the accompanying drawings, whereby is shown preferred and modified embodiments of the invention, but it is to be understood that many other changes variations and modifications can be resorted to which come within the scope of the claims hereunto appended. I would have it expressly understood that I in no wise limit myself either to the number, arrangement, mounting or connection of any parts which happen to have been arbitrarily selected, nor to the manner of their coöperation with or substitution for such parts as may have been commonly employed prior to my invention.

Adverting to the drawings:

Figure I is a side elevation showing an automobile embodying my invention.

Fig. II is a top plan of the same.

Fig. III is a section on line III—III of Figs. I and II looking in the direction of the arrows.

Fig. IV is a side elevation on a reduced scale, showing a modified application of the principles of my invention to a different type of vehicle.

Fig. V is a section on line V—V of Fig. IV.

Fig. VI is an elevation of one side of an automobile showing in connection therewith a second modification of my invention.

Fig. VII is an elevation of the opposite side of the automobile embodying the modification displayed in Fig. VI.

The superstructure of the type of automobile which has been selected to exemplify the preferred form of my invention has been designated in its entirety by the reference numeral 1. Its mounting through the agency of a chassis comprising springs and axles may be inferred as accomplished in any feasible manner not shown. Such chassis may be furthermore assumed as operatively connected for movement upon four wheels, the left front wheel being designated as 2 while the left and right rear wheels are numbered 4 and 5 respectively. As illustrated the engine hood 6 slopes downwardly in a forward direction. The upper rear end of the superstructure carries the usual folding top 7. The seating compartment comprises divided front seats 8 and a rear seat 9. The rather terse description of the parts so far mentioned should satisfy the official requirements because nothing is claimed in connection therewith.

Carried along each side of the seating compartment proper are a pair of elongated compartment forming structures, the one at the left being designated as 10 whereas the one at the right is designated as 11. These structures are to serve the purpose of storage compartments of predetermined shape and dimension so as to most nearly meet the artistic characteristics of the particular vehicle in associaton with which they are to be employed. The compartments as such are to obviate the need of separate running boards and fenders and present the main portion of the side surface of the car as a substantially smooth clearance plane. The structures 10 and 11 have bottoms 12 and 13 respectively, forwardly and upwardly arched front defining edges 14 to constitute fender surfaces extending partially around the front wheels 2 and 3, and upwardly and rearwardly arched defining edges 16 to also constitute fender surfaces extending partially around the rear wheels 4 and 5. The fore top defining surfaces 18 and 19 may be given the same downward inclination as the hood 6. The rear top defining surfaces 20 and 21 reach a height corresponding with the upper longitudinal edges 22 and 23 which pass the cowl to merge with the upper ends of the surfaces 18 and 19. Extending across the rear is an inwardly and downwardly curved compartment-forming structure 24 which may serve as the fuel tank and if desired support the number plate 25 in the manner shown. The structure 24 not only merges symmetrically with the surfaces 20 and 21 but is so recessed forwardly on opposite sides of the seating compartment as to form complementary rear fender forming surfaces 26 which are continuations of the surfaces 16. This arrangement is apparent upon inspection of Fig. I.

The outer edges of the bottoms 12 and 13, of the surfaces 14, and of the surfaces 16 are all within the outermost plane of the structures 10 and 11 to thereby effect the lateral "stream-plane" appearance in addition to the now generally adopted "stream-line" of the upper portions 22 and 23 respectively The structures 10 and 11 may or may not be provided with a series of partitions, depending upon individual fancy. In order to be usefully adapted as storage compartments as well, the structures 10 and 11 are provided with doors. In order to make possible a convenient and dignified entry to the seating compartment, passage-ways are also provided. By reason of the circumstance of the divided front seat arrangement sufficient convenience may be assured by the provision of only two passageways and these are preferably diagonally located. In this manner the remaining space which is available for the reception of miscellaneous articles of equipment or personal convenience is considerably increased. Fig. I shows the forward part of the structure 10, which is on the steering side of the vehicle, to be provided with a door 28 hinged in front at 29 and provided with a knob 30, and also with a door 31 in this instance of equal size which is hinged in the rear at 32 and likewise provided with a knob 33. As is suggested by the dotted lines the compartment space to which access is had through the doors 28 and 31 may be adapted to contain a couple of suit cases, a tool box and a hand bag. The rearward part of the structure 10 is fashioned with a passage-way in open communication with the seating compartment, which passageway may be closed both across its outer plane and its upper plane by a door of L-shaped cross section to comprise an upright surface 34 and an inwardly extending horizontal surface 35 above. Such door carries a knob 36 and is slidably mounted on rollers 37 so as to enable a person to move it forwardly into the adjoining part of the structure 10. The dimensions of the tool box and hand bag are to be presumed to be so limited as to permit of the passage of the surface 34 adjacent the door 31 and the surface 35 underneath the edge 22. As may be seen in Figs. I and II a door so constructed is as little conspicuous as possible and when closed completes the continuity in outward appearance of the side of the vehicle. So much of the space as remains disposed between the rear upright edge of the passageway and the forward confining wall of the fuel tank 24 may be utilized for the retention of golf sticks, umbrellas and lower still such small wearing apparel as gloves, goggles or caps. Access may be had to the space just mentioned either by other doors (not shown) or through an opening through the rear of the passage-way.

Inasmuch as the opposite side structure 11 is similarly constructed though reversed to have its passage-way in front closed by a door 38 having a knob 39 and therefore necessarily its rear part adapted for the accommodation of such accessories as the spare tires and battery box which are disclosed in dotted lines, no further description thereof is necessary. Such spaces as may be available forwardly of the passage way through the structure 11 which the door 38 is to close chances to be shown occupied by another traveling case. It will be noticed moreover, that the door 38 has been opened to occupy a position outside of and over the front portions of the spare tires. Attention is directed to the availability of those portions of the bottoms 12 and 13 for the support of additional packages which are sheltered under and within the doors, when the latter are drawn closed. In some instances entry to the storage compartment might preferably be contrived from the seating compartment through an inside opening, and thus possibly make the doors along the outer sides quite unnecessary.

The modification to which Figs. IV and V have reference indicate the application of my invention to a coupé and obviously on similar theory to the limousine type of body. The inclosed seating compartment 40 of this style of automobile similarly carries on its opposite sides the storage structures 41 and 42 to afford a merging contour therewith. These structures 41 and 42 similarly include the bottoms 43 and 44 which are seen in Fig. V. Only that particular compartment 41 which is on the near side to the observer as Fig. IV is presented need be further described. It includes a front fender surface 45, a rear fender surface 46 and a door 47 therebetween. The door 47 is a unit hinged at 48 and having a handle 49 on its upper portion which is positioned inwardly to conform to the plane of the seating compartment 40. The lower portion of the door or that part which corresponds to the height of the storage compartment 41 has its outer plane in symmetrical alinement with the outer plane of such storage compartment as clearly appears in Fig. V.

Figs. VI and VII refer to a second modification in which storage compartments having passage-ways may be removably carried by a given make of automobile for which they were intentionally built. Such storage compartments might be an optional purchase as an extra for long cross country tours and if desired only one need be acquired for one particular side of a car.

According to this modification the storage compartment 50 is supported upon the prevalent style of running board 51 and snugly fitted between the fenders 52 and 53. By this means its bottom, front and rear confining surfaces could either be entirely dispensed with or such surfaces 54, 55 and 56 be contrived as shown to conform and rest upon the running board and pair of fenders 52 and 53. The compartment 50 carries a hinged door 57. The fitted abutting engagement of the top of the storage compartment 50 so as to be substantially flush with the upper "stream-line" edge is to be presumed, while the forward portion 58 and rear portion 59 may be gracefully sloped to merge with the fenders. Mention is again made of the possibility of having the storage compartment provided with an opening or sliding door on its inner side at a point opposite the ordinary location of a door to the seating compartment if such had been first removed.

I claim:

1. A vehicle body comprising a seating compartment including a rear seat and a divided front seat, a pair of storage compartments spaced apart one ahead of the other on each side of said seating compartment, the top and bottom of said storage compartments substantially conforming to the top of said seating compartment and the clearance line of the vehicle respectively, the space between that pair of storage compartments which are on one side of the vehicle being diagonally opposite from the space between that pair of storage compartments on the other side and forming passageways to said seating compartment opposite said front and rear seats respectively and side doors for each of said passageways.

2. A vehicle body comprising a seating compartment provided with a lateral aperture, a storage compartment carried alongside said seating compartment and provided with a passageway in communication with said aperture, and a sliding door having an inwardly extending top and adapted to extend across such passageway or into said storage compartment.

3. A vehicle body comprising a seating compartment located inwardly of the wheels of the vehicle and having a pair of lateral passenger entries open above, a pair of storage compartment-forming structures carried along opposite sides of said seating compartment and extending partially around and somewhat outwardly beyond said wheels, said structures also extending upwardly above said wheels, each of said storage compartments being formed with a passageway in open communication with one of said entries, and a door across each passageway and having a top substantially corresponding in breadth to said structures adapted to close and bring the top thereof in substantial alinement with the top of said structures.

4. A vehicle body comprising a seating compartment, a storage compartment provided with an uncovered passageway, and an L shaped door mounted for sliding movement across said passageway and into said storage compartment, said door adapted to cover the top and close the outside of said passageway to form a substantial continuation of both such exterior surfaces of said compartment and an interjacent storage space open to and accessible from said seating compartment.

5. A vehicle body comprising a seating compartment provided with an entry, a storage compartment alongside the same and having a passageway therethrough in line with said entry, and a sliding door of L shaped cross section having an upright surface nearly flush with the side of said storage compartment and having a substantially horizontal surface nearly level with the top longitudinal edge of said storage compartment, said door being adapted to occupy a position in said storage compartment or extend across said passageway, whereby to open or close the latter between the adjoining divisions of said storage compartment.

6. A vehicle body comprising a chassis provided with a laterally projecting step, a seating compartment structure carried by said chassis and spaced inwardly of said step, front and rear fenders curved toward each other and having their lower ends in line with said step, and a distinct storage compartment formed in conjunction with said step and fenders and extending from said step to the top of said seating compartment, said structure having a passage-way over said step into said seating compartment, a door covering the top and outer side of said step, and a separate door leading to said storage compartment.

7. A vehicle body comprising a seating compartment provided with a lateral entry, a hollow structure carried along one side of said seating compartment and provided with a passageway opposite said entry, the interior of said structure being divided by and in open communication with said passageway both forwardly and rearwardly thereof, a door adapted to extend across said passageway or be moved into said structure, the room afforded in the latter being sufficient to accommodate storage articles together with said door.

8. A vehicle body comprising a seating compartment provided with a lateral entry, a hollow structure carried along one side of said seating compartment and provided with a passageway opposite said entry, the interior of said structure being in open communication with said passageway and a door movable inwardly adjacent to the outer side of said structure and adapted to be inclosed therein or to extend across said passageway whereby articles may be stored both in said structure and in said passageway.

9. A vehicle body comprising a seating compartment having front and rear seats, a hollow storage structure carried alongside said seating compartment, said structure being formed with a passageway leading to said compartment ahead of one of said seats and a door slidable in said structure and across the outer plane of said passageway, said structure adapted to inclose articles alongside said door.

10. A vehicle body comprising a seating compartment having front and rear seats and a lateral entry, a hollow storage structure carried alongside said seating compartment, said structure having a bottom and being formed with a passageway in line with said entry, said bottom serving as a step at said passageway, a sliding door having an overhanging top adapted to cover said passageway and movable into said structure, and another door to said structure and adapted to permit of the insertion of articles for storage adjacent the path of movement of said first mentioned door.

Signed by me, this 27th day of July, 1915.

CURT B. MUELLER.